June 12, 1945. W. L. POLLARD 2,378,035
HYDRAULIC PLANETARY TRANSMISSION
Filed Jan. 14, 1943 3 Sheets-Sheet 1
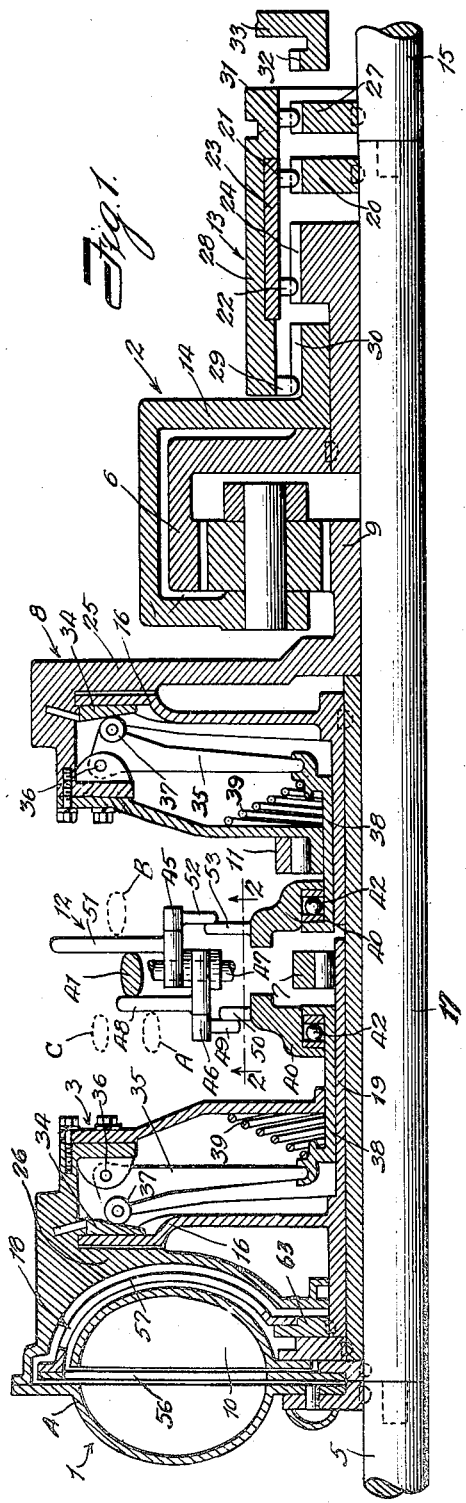

June 12, 1945.  W. L. POLLARD  2,378,035
HYDRAULIC PLANETARY TRANSMISSION
Filed Jan. 14, 1943  3 Sheets-Sheet 2
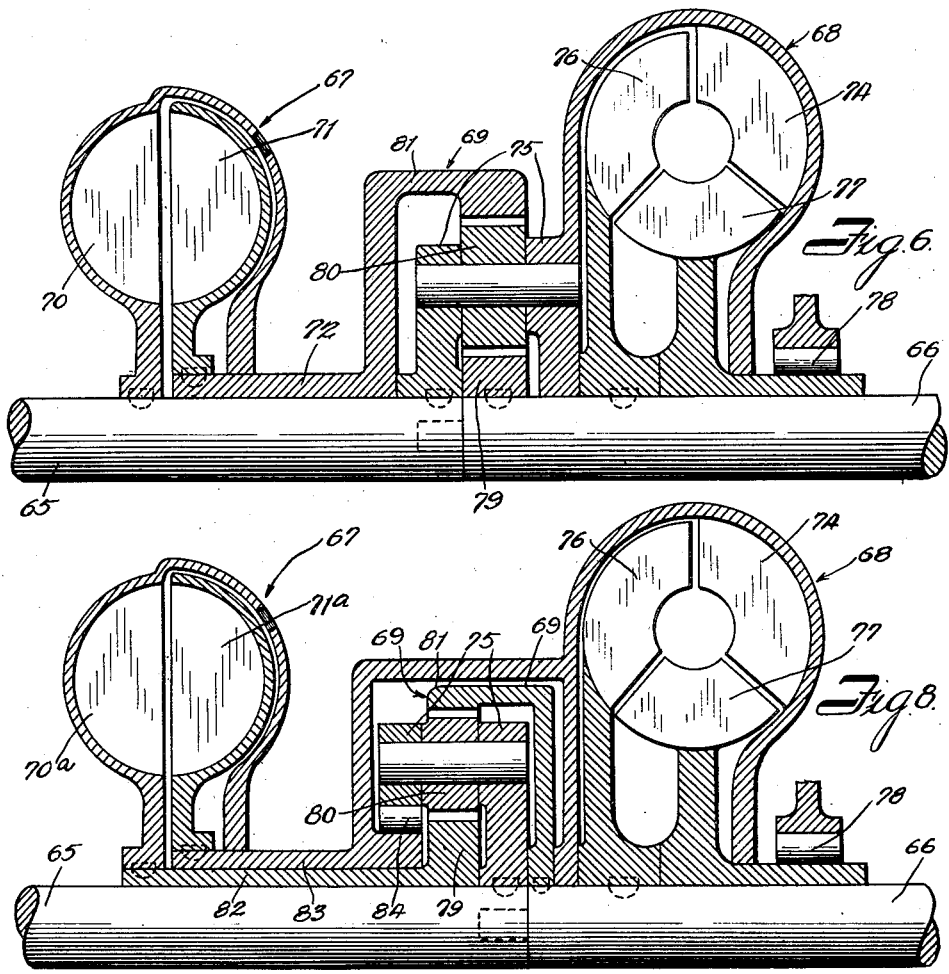
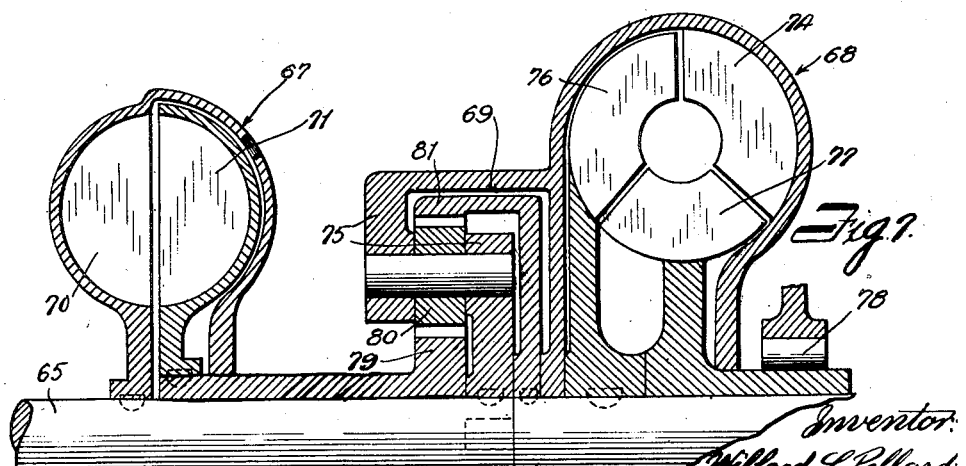

June 12, 1945.  W. L. POLLARD  2,378,035
HYDRAULIC PLANETARY TRANSMISSION
Filed Jan. 14, 1943  3 Sheets-Sheet 3
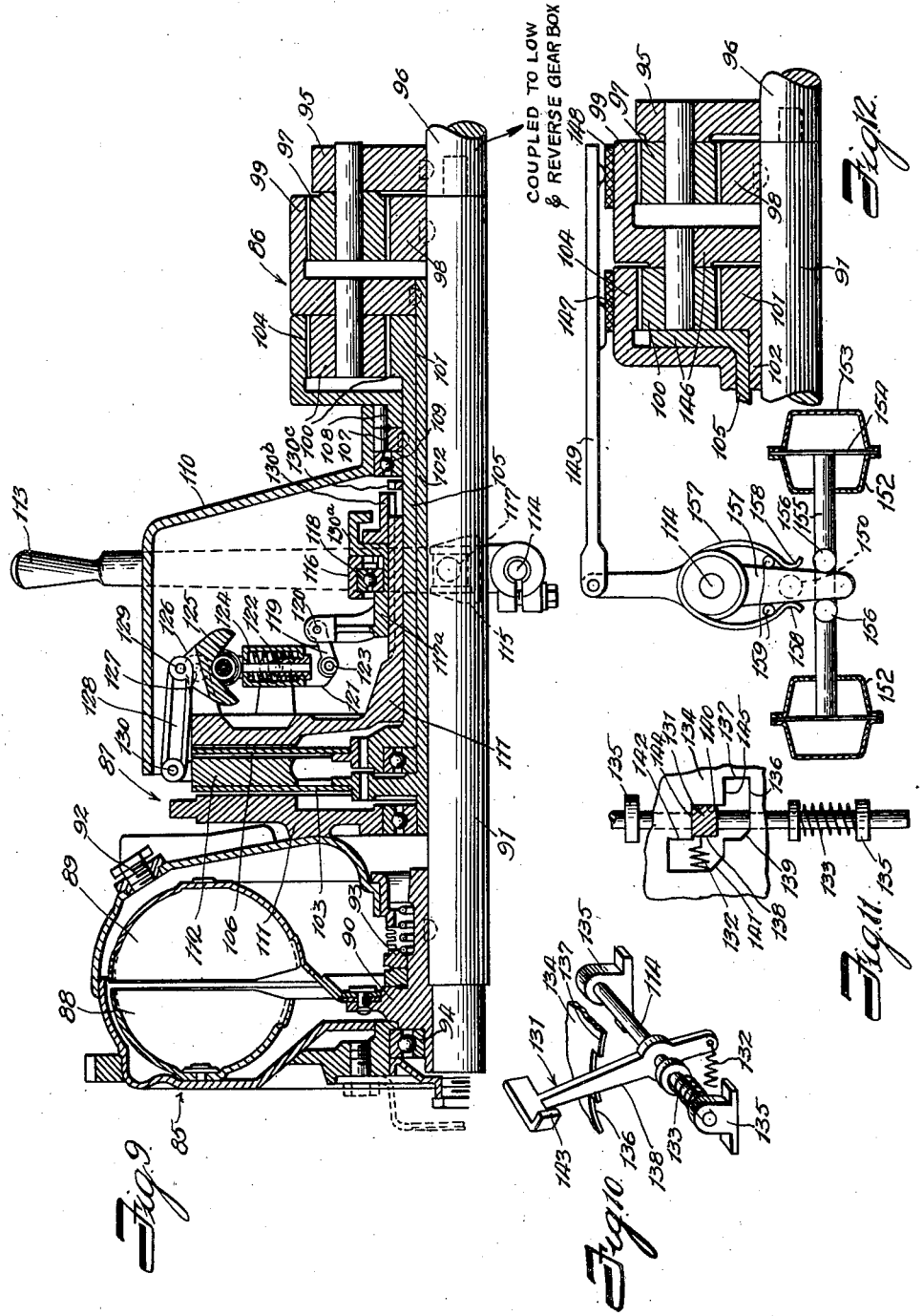

Patented June 12, 1945

2,378,035

UNITED STATES PATENT OFFICE 2,378,035

HYDRAULIC PLANETARY TRANSMISSION

Willard L. Pollard, Evanston, Ill.

Application January 14, 1943, Serial No. 472,314

5 Claims. (Cl. 74—189.5)

My invention relates to hydraulic planetary transmissions.

One of the objects of my invention is to provide an improved hydro-planetary transmission which will have continuous-power gear-change.

A further object is to provide such a construction which will have improved means for effecting the gear-change.

Further objects and advantages of the invention will be apparent from the description and claims.

In the drawings, in which several embodiments of my invention are shown,

Figure 1 is an axial sectional view of the transmission;

Fig. 2 is a section substantially on the line 2—2 of Fig. 1;

Fig. 3 is a fragmentary plan view of a guide and latch for the gear shift lever;

Fig. 4 is a side elevational view of one part of a torque-transmitting rotor;

Fig. 5 is an elevational view of another part of the torque-transmitting rotor;

Figs. 6, 7 and 8 are axial sections showing other forms of transmission;

Fig. 9 is an axial view showing another form of the invention;

Fig. 10 is a perspective view of a pedal control;

Fig. 11 is a plan view of Fig. 10; and

Fig. 12 is an axial sectional view showing a modified form of transmission.

Referring to Figs. 1 to 5, inclusive, the construction shown therein comprises a hydraulic coupler 1, a planetary transmission 2, a clutch 3 for connecting the pump rotor 4 and motor shaft 5 with the ring gear 6, a one-way anchor 7 for preventing reverse rotation of the ring gear 6, a clutch 8 for connecting the sun gear 9 with the turbine rotor 10, a one-way anchor 11 for preventing reverse rotation of the sun gear 9, manually operable means 12 for controlling the two clutches 3 and 8, and clutch instrumentalities 13, which in one position connect the ring gear 6 with the driven member of the clutch 3 and connect the gear carrier 14 with the propeller shaft 15, and in another position of the clutch instrumentalities, connect the ring gear 6 with the propeller shaft 15 and hold the gear carrier 14 against rotation.

The pump rotor 4 is secured to rotate with the motor shaft 5. The driven plate member 16 of the clutch 3 is connected with the intermediate shaft 17 by a fluid-transmitting torque-transmitting rotor 18.

In operation for all three forward drives, the clutch instrumentalities 13 are placed in the position shown in Fig. 1. For low speed ratio, the clutch 3 is disconnected and the clutch 8 is connected. Under these conditions, the sun gear 9 is driven from the turbine rotor 10 through the clutch 8 and the ring gear 6 is held against reverse rotation by the one-way anchor 7. The connection from the one-way anchor 7 to the ring gear 6 is through the tubular shaft 19, fluid-transmitting torque-transmitting rotor 18, the intermediate shaft 17 to which this torque-transmitting rotor is keyed, the clutch ring 20, keyed to the shaft 17, clutch teeth 21 and 22 on the clutch sleeve 23, and the clutch sleeve 24 to which the ring gear 6 is keyed.

For intermediate forward speed, the clutch 3 is connected and the clutch 8 is disconnected. Under these conditions, the sun gear 9 and driven clutch member 25 are held against reverse rotation by the one-way anchor 11 and the ring gear 6 is connected to rotate with the pump rotor 4 and motor shaft 5 by the clutch 3. The connection from the clutch 3 is from the driving clutch member 26 through the driven clutch plate 16, the fluid-transmitting torque-transmitting rotor 18, the intermediate shaft 17, the clutch ring 20, the clutch sleeve 23 and the clutch sleeve 24.

For high speed gear ratio, both clutches 3 and 8 are connected so that the sun gear 9 will be driven from the turbine rotor 10 and the ring gear 6 will be driven from the pump rotor 4 and motor shaft 5.

For reverse, the clutch 8 is connected, the clutch 3 is disconnected, and the clutch instrumentalities are shifted to their rear positions in which the gear carrier 14 is held against reverse rotation and the ring gear 6 is connected with the propeller shaft 15. The connection from the ring gear 6 to the driven shaft 15 is through the clutch sleeve 23, the front teeth 22 of which engage the clutch sleeve 24 and the rear teeth 21 of which engage the clutch ring 27 on the propeller shaft 15.

The gear carrier 14 is held against reverse rotation by the clutch sleeve 28, the front teeth 29 of which engage the clutch ring 30 on the gear carrier and the rear teeth 31 of which engage the teeth 32 on the fixed clutch ring 33. Under these conditions, the sun gear 9 is driven from the turbine rotor 10 through the clutch 8, the gear carrier 14 is held against reverse rotation and the ring gear 6 and propeller shaft 15 are rotated in a reverse direction at relatively low speed. The clutches 3 and 8 may be of any usual or suitable construction, each comprising a driven clutch plate 16, a shiftable pressure or clamping plate 34 for engaging the driven plate 16 and a plurality of levers 35, each pivoted at 36 on the driving clutch member and provided with a roller 37 for bearing on an inclined surface on the clamping plate 16. The inner ends of these levers engage an annular groove in an axially shiftable sleeve 38, which is urged toward the driven clutch plate by a coil compression spring 39. The action of this spring 39 is such as to tend to move the levers 35 in a direction to cause the clamping plate 34 to grip the driven clutch plate 16. The positions of these sleeves are controlled by axially movable non-rotatable clutch-operating rings 40, which, in turn, are controlled by the manually operable gear-change lever 41. A thrust bearing 42 is provided between the ring 40 and the sleeve 38.

This manually operable gear-change lever is mounted for limited universal movement on a support 43 (Fig. 2) and is shiftable to and held in any one of three different positions corresponding to the three gear ratios, as shown at A, B and C in Figs. 1, 2 and 3, Figs. 2 and 3 of which show a slotted guide plate 44 in which the gear shift lever 41 travels. The transmission from this gear shift lever 41 to the clutch-controlling rings 40 comprises a pair of rock levers 45 and 46 oscillatingly mounted on the shaft 47. One of these levers 46 controls the front clutch 3 and the other lever 45 controls the rear clutch 8. The front clutch-controlling lever 46 is provided with a pin 48 which engages the gear-changing lever 41 and with another pin 49 which engages a pin 50 on the front clutch-shifting ring 40.

The transmission from the gear-changing lever 41 to the other clutch-shifting ring 40 comprises the rock lever 45 oscillatingly mounted on the shaft 47 and having a pin 51 for engaging the gear-changing lever 41 and another pin 52 for engaging a pin 53 on the clutch-shifting ring 40. It will be noted that the action of the coil compression springs 39 is such as to hold the pins 48 and 51 against the lever 41.

It should be noted that the universally mounted clutch control lever can be shifted laterally sufficiently to enable it to clear the pin 48 on the rock lever 46 which controls the front clutch 3.

The operation of the gear-change lever 41 will now be described. If the lever 41 is placed in the position D, both sleeves 38 will be in midposition and both clutches 3 and 8 will be disconnected. If the lever 41 is moved to position A, it will, because of its engagement with the pin 48, cause the pin 49 to move to the right as viewed in Figs. 1 and 3, and consequently force the pin 50 to the right because of engagement of the pin 49 with the pin 50. This will move the front clutch sleeve 38 to the right against the action of the spring 39 and will release the front clutch plate 16, permitting the ring gear 6 to be held against reverse rotation by the one-way anchor 7. Furthermore, the movement of the lever 41 to position A will enable the pin 51 to move to the left and the pin 53 to move to the right under the action of the spring 39 of the rear clutch 8 to cause the rear clutch 8 to engage to connect the sun gear with the turbine rotor 10. This will give low speed forward. The biasing action of the springs 39 on the pins 50 and 53 is indicated by the arrows E and F in Fig. 2. The biasing action of the front spring 39 will hold the lever 41 in the recess 54 in the guide plate 44 adjacent the front position A.

For intermediate gear, the lever 41 is shifted from position A to position B. In this movement, the lever 41 will press against the pin 51 to move it to the right, forcing the pin 53 to the left by engagement of the pin 52 with the pin 53. This will release the rear clutch 8 because of the left hand movement of the sleeve 38 and will enable the front clutch 3 to move to connecting position since the spring 39 of the front clutch will cause the pin 48 to follow up the movement of the clutch-controlling lever 41. The clutch-controlling lever 41 will be held in engagement with the retaining notch 55 in the plate 44 by the action of the spring 39 of the rear clutch 8. In this position of the clutch lever 41, the front clutch 3 will be connected and the rear clutch 8 will be disconnected, thus driving the ring gear 6 from the motor shaft 5 and allowing the sun gear 9 to fall back on the one-way anchorage 11.

For high gear, the lever 41 is moved to position C. The initial lateral movement of the lever 41 moves it out of engagement with the pin 48, so that the spring 39 of the front clutch 3 will hold the front clutch 3 in connected position. The movement of the lever 41 to position C will allow the spring 39 of the rear clutch 8 to expand and place the clutch in connected position since this left hand movement of the lever 41 enables the pin 51 to move to the left allowing the pin 53 to move to the right. Under these conditions, with both clutches 3 and 8 connected, the sun gear will be connected to the turbine rotor 10 and the ring gear will be connected with the motor shaft 5. Under these circumstances, approximately twothirds of the power will be by-passed around the hydraulic part of the transmission.

Figs. 4 and 5 show somewhat in detail the construction of the fluid-transmitting torque-transmitting rotor. As shown, it comprises two parts 56 and 57 secured together at their rims. One part 56 comprises a flat sheet extending between the pump rotor 4 and the turbine rotor 10, having a central hub portion 58 secured to a hub keyed to the shaft 17, arcuate portions 59 secured to the corresponding arcuate portions 60 on the other part 57 of the rotor and spoke portions 61 connecting the arcuate portions 59 with the hub portion 58. This construction enables relatively free flow of the liquid.

The other portion 57 of the rotor comprises a hub 62 secured to a hub 63 keyed to the shaft 19. The aforesaid arcuate portions 60 are secured to the arcuate portions 59 of the flat rotor portion 58 and the spoke portions 64 connect the arcuate portions with the hub portion. This construction also minimizes friction and turbulence.

The construction shown in Fig. 6 comprises a motor-driven shaft 65, a propeller shaft 66, a hydraulic coupler 67, a hydraulic torque converter 68 and a planetary gear construction 69. The coupler 67 comprises a turbine rotor 70 keyed to the motor shaft 65 and a pump rotor 71 keyed to a sleeve 72 on the ring gear 81. The torque converter comprises a pump rotor 74 secured to rotate with the gear carrier 75 of the planetary transmission, a turbine rotor 76 keyed to the propeller shaft and a stato-rotor 77 held against reverse rotation by a one-way anchor 78. The gear carrier 75 is keyed to the motor shaft 65. The sun gear 79 is keyed to the propeller shaft 66.

With this construction, power supplied from the motor shaft 65 to the gear carrier 75 is divided along three paths. One path is from the gear carrier through the planet gearing to the sun gear 79. Another path is from the gear carrier 75 through the pump rotor 74, stato-rotor 77 and turbine rotor 76 to the propeller shaft 66. The third path is through the planet gearing 80, ring gear 81, hollow shaft 72, pump rotor 71, turbine rotor 70, motor shaft 65 and gear carrier 75, this latter path forming in effect a regenerative circuit with slip in the circuit between the pump rotor 71 and turbine rotor 70.

The coupler 67 and converter 68 can be so designed that when there is a high torque load on the propeller shaft, a large proportion of the power required will be distributed through the torque converter, thus giving a relatively high torque, and so that when the torque load on the propeller shaft is relatively low, a large proportion of the power required at the propeller shaft will be distributed through the hydraulic coupler 67 and the sun gear 79.

It will also be noted that in this construction, the difference in speed between the turbine rotor 70 and pump rotor 71 of the coupler will be materially less than the difference in speed between the turbine rotor 76 and the pump rotor 74 of the hydraulic torque converter.

The construction shown in Fig. 7 is similar to that just described, except in this form, the sun gear 79 is connected to rotate with the pump rotor 71 of the coupler 67 and the ring gear 81 is connected to rotate with the propeller shaft 66. In this form, the difference in speed between the turbine rotor and pump rotor of the hydraulic coupler 67 will be materially greater than the difference in speed between the turbine rotor and pump rotor of the hydraulic torque converter 68.

The construction shown in Fig. 8 is quite similar to that shown in Fig. 7. In Fig. 8, the pump rotor 70a of the coupler is mounted on a sleeve 82 rotatable with the sun gear 79 and the turbine rotor 71a of the couper is mounted on a sleeve 83 rotatable with the pump rotor 74 of the converter. A one-way clutch 84 is provided between the gear carrier 75 and the pump rotor 74 which enables the gear carrier to drive the pump rotor 74 at times when the turbine rotor 71 does not develop sufficient torque to cause the pump rotor 74 to precess with respect to the gear carrier 75.

In this construction, there will be, in general, two conditions in both of which torque increase is obtained between the motor shaft 65 and the propeller shaft 66. In the first condition, it will be assumed that the power and load are such that the torque exerted by the turbine rotor 71 is so slight as not to cause the pump rotor 74 to precess with respect to the gear carrier 75. Under these conditions, the main power path from the motor shaft 65 to the propeller shaft 66 will be through the gear carrier 75, one-way clutch 84, pump rotor 74, stato-rotor 77 and turbine rotor 76 to the propeller shaft 66. This will give a relatively high torque increase, as only a small proportion of the power flow is through the ring gear 81 and the coupler 67.

In the second condition, it is assumed that the load and power conditions are such that the torque exerted on the turbine rotor 71a by the pump rotor 70a is sufficient to cause the pump rotor 74 to precess with respect to the gear carrier 75. Under these conditions, the power flow between the motor shaft 65 and the propeller shaft 66 will be divided, part going through the coupler 67 and converter 68, and part going through the ring gear 69. This will give a relatively high efficiency, as a large proportion of the power does not flow through the hydraulic part of the transmission.

When the load and power conditions are such that the torque on the stato-rotor 77 changes from reverse to direct, the stato-rotor 77 will begni to rotate in the direction of rotation of the pump rotor 74 and the converter 68 will begin to act as a coupler.

The construction shown in Fig. 9 comprises a fluid coupler 85 which may be driven from a motor, a compound planetary transmission 86 and a twin disc clutch 87 for changing the speed ratio of the planetary transmission.

The hydro-coupler 85 comprises a pump rotor 88 which may be secured to the crankshaft of the motor, a turbine rotor 89 secured to a hub 90 which is secured to the intermediate shaft 91, a filling opening closed by a plug 92, an oil seal 93, and a ball bearing 94 between the hub 90 and the pump rotor 88.

The planetary transmission 86 comprises a gear carrier 95 secured to rotate with the propeller shaft 96, planet gearing 97 mounted on said gear carrier, a sun gear 98 secured to the intermediate shaft 91 and meshing with the planet gearing 97, a ring gear 99 meshing with the planet gearing 97 and mounted on a sleeve 102 on which the clutch plate 103 is splined, planet gearing 100 mounted on the ring gear 99, a sun gear 101 meshing with the planet gearing 100 and secured to a tubular shaft 105 on which one of the clutch plates 106 is splined, a ring gear 104 meshing with the planet gearing 100, a one-way anchor 107 for preventing reverse rotation of the sun gear with respect to the ring gear, a one-way anchor 108 for preventing reverse rotation of the ring gear 104, and a ball bearing 109 between the housing 110 and the ring gear 104.

The twin disc clutch construction 87 comprises the driving head 111 secured to rotate with the pump rotor 88, the pressure plate 112 operating between the two clutch discs 103 and 106, a handle 113 for operating the pressure plate 112, and transmission between the handle 113 and pressure plate 112 whereby in mid-position of the operating lever or handle 113 neither clutch plate will be connected, whereby in the left-hand position of the operating lever, the front clutch plate 103 controlling the ring gear 99 will be connected and the rear clutch plate 106 will be disconnected, and in the right-hand position of the operating lever the rear clutch plate 106 secured to the sun gear 101 will be connected and the front clutch plate 103 will be disconnected.

This transmission between the lever 113 and pressure plate 112 comprises a rockshaft 114 to which the operating lever 113 is secured, a short crank arm 115 secured to this rockshaft 114, a nonrotatable clutch shifting ring 116 having trunnions 117 engaged by the short rock lever 115 and shifted back and forth by movement of the lever 113, another clutch shifting ring 117a rotatable with the clutch driving head 111, a ball bearing 118 between the two clutch shifting rings to enable rotation of the second clutch shifting ring 117, a plurality of links 119 each pivotally connected at 120 with the clutch shifting ring, a plurality of rock levers 121, each pivotally mounted at 122 on the clutch driving head and pivotally connected at 123 with the link 119, a plurality of spring pressed plungers 124, one mounted on each of the rock levers 121, each provided with an anti-friction roller 125. a plurality of three-armed rock levers 126, each pivotally mounted at 127 on the clutch driving head 111, and a plurality of links 128 pivotally connected at 129 with the three-armed rock lever 126 and pivotally connected at 130 with the pressure plate 112 of the clutch. The above-described clutch construction is substantially standard construction and well known in this art.

The right- and left-hand members of the driving head 111 may be secured to rotate together in any suitable manner as by means of bolts, as shown in Fig. 14 of my Patent No. 2,302,714.

With this construction for low gear, the clutch lever is placed in a neutral position in which neither clutch plate is connected. Under these conditions, the one-way anchorage 108 holds the ring gear 104 against reverse rotation, the one-way clutch 107 holds the sun gear 101 against reverse rotation and thus the ring gear 99 is held against reverse rotation. The turbine rotor 89 is driven from the pump rotor 88, thus driving the gun gear 98. Assuming a gear ratio of 2:1 of the ring gear and sun gear, this will give a speed ratio between the intermediate shaft 91 and propeller shaft 96 of approximately 3:1.

If it is desired to shift to intermediate gear, the clutch lever 113 is moved rearwardly, connecting the clutch plate 106 to rotate with the pump rotor 88. Under these conditions, the one-way anchor 108 will hold the ring gear 104 against reverse rotation, and the ring gear 99 will be driven at a relatively low speed by the action of the sun gear 101. This will increase the speed of the propeller shaft 96 since now the ring gear 99 also is rotated. With a gear ratio of approximately 2:1 between the ring gear 104 and the sun gear 101, the overall speed ratio between the intermediate shaft 91 and propeller shaft 96 will be approximately 9:5.

If, now, it is desired to shift to high gear, or substantially direct drive, the lever 113 is moved to the left as far as it will go, disconnecting the rear clutch plate 106 and connecting the front clutch plate 103. This will connect the ring gear 99 to rotate wtih the pump rotor 88 and crankshaft. Under these conditions, there is substantially a direct drive between the motor and propeller shaft 96.

It will be noted that both in intermediate speed and in direct drive a large proportion of the power is by-passed around the hydraulic part of the transmission and that in the shift from one gear ratio to another there is continuous power flow.

It may be desirable, in shifting from intermediate gear, in which the sun gears 101 and 98 are supplying power, to high gear in which power is supplied by the sun gear 98 and ring gear 99, to maintain the power flow through the sun gear 101 after the pressure plate 112 has released the clutch plate 106 until the pressure plate 112 is in substantially neutral position. If desired, this may be accomplished by securing a shifter ring 130ª integral with the splined sleeve 117, which operates a dog clutch sleeve 130ᵇ splined on the sleeve of the driving head 111. This dog clutch sleeve 130ᵇ is movable into and out of engagement with a dog clutch ring 130ᶜ integral with the sleeve 105 on which the sun gear 101 is mounted. A lost motion connection is provided between the flange on the splined clutch sleeve 130ᵇ and the flange on the shifter ring 130ª in order that the clutch sleeve 130ᶜ will not engage the clutch ring 130ᶜ until after the pressure plate 112 has gripped the clutch disc 106. After this gripping action takes place, a slight further movement of the lever 113 will effect the dog clutch engagement, which will positively connect the driving head 111 with the sun gear 101. In shifting from intermediate to high, by shifting the lever 113 from its rearward to its forward position, the first movement of the latter will release the clutch plate 106 but will not release the dog clutch ring 130ᶜ until the lever 113 has been moved substantially to neutral position, due to the lost motion connection between the clutch shifting ring 130ª and the splined clutch sleeve 130ᵇ.

This will continue the power flow through the sun gear 101 until the lever 113 is in neutral position. A further short movement of the lever 113 will force the pressure plate 112 forward to grip the clutch plate 103 to cause power flow through the ring gear 99.

In Figs. 10 and 11 is shown a pedal construction which may be substituted for the hand lever shown in Fig. 9. This pedal construction comprises a pedal 131 secured to the rock shaft 114 which effects the clutch control, a coil tension spring 132 connected to the pedal 131 to urge it in clockwise direction, a coil compression spring 133 surrounding the shaft 114 and urging the pedal 131 to the right, as viewed in Fig. 10, a slotted plate 134 through which the pedal lever 131 extends for controlling the movement of the pedal, and bearing brackets 135 for the rock shaft 114. The rock lever 115 may be mounted on the rock shaft 114. The pedal 131 has three positions determined by the formation of the slot 136 in the plate 134. In the right-hand position, the pedal lever is in the right-hand notch 137, the tension spring 132 holding it in this position. In this position, the rear clutch plate 106 may be connected for intermediate speed. For low speed, the pedal is depressed to bring the front edge 138 of the lever against the sloping shoulder 139 on the slot which will edge the lever upwardly as viewed in Fig. 11 to bring the rear edge of the lever in front of the shoulder 140 of the slot, whereupon the coil compression spring 133 will snap the lever over to the position as shown in Fig. 11. In this position, the transmission will be in low gear, neither clutch plate being connected. For high gear, the pedal 131 is again depressed to bring the front edge of the lever against the sloping shoulder 141 of the slot. This will give the lever 131 another shift upwardly, as viewed in Fig. 11, bringing the rear edge of the lever in front of the shoulder 142 of the slot, whereupon the coil compression spring 133 will snap the lever upwardly, as viewed in Fig. 11, causing the lever to be held securely in its forward position. This will give the high gear ratio, the clutch plate 103 being connected. To operate the lever to cause it to move rearwardly, the foot is brought into engagement with the finger 143 on the pedal to press the pedal to the left, as viewed in Fig. 10, to bring the corner of the lever against the sloping shoulder 141 of the slot, forcing the lever to the right to bring the lever 131 below the shoulder 144 in the slot, as viewed in Fig. 11. The coil tension spring 132 will then jerk the lever to the full-line position shown in Fig. 11. To go into high gear, the foot is again brought into engagement with the finger 143 on the foot pedal to move it downwardly, as viewed in Fig. 11, to bring the corner of the lever against the sloping shoulder 139 of the slot. This will bring the lever below the shoulder 145 in the slot and the coil tension spring 132 will again snap the lever to the right, as viewed in Fig. 11, to place the transmission in high gear, the clutch plate 106 being connected.

The construction shown in Fig. 12 may be in general similar to that shown in Fig. 9, except that a somewhat different form of planetary gearing is used and a power device is provided for effecting the gear change.

Referring, first, to the planetary gearing, the gear parts 95, 97, 98, 99, 100, 101 and 104 may be substantially the same as shown in Fig. 9. In this form, however, the gear carrier 146 which carries the planet gearing 100 is connected to the sleeve 105 of the rear clutch disc 106, and the ring gear 104 is floating except as it is controlled by the brake band 147. Brake bands 147 and 148 are substituted for the one-way anchors 108 and 107 of Fig. 9.

In this form, for low gear, both clutch plates 103 and 106 are disconnected, and both brakes 147 and 148 may be applied as shown in Fig. 12. With the ring gear 99 thus held and the sun gear 98 driven from the turbine rotor, the speed ratio of the intermediate shaft to propeller shaft will be approximately 3:1. For intermediate speed, the brake controlling rod 149 is moved to the right to disconnect the rear brake 148, the front brake still remaining connected. This movement of the rock shaft 114 to effect the brake operation also connects the front clutch plate 103, leaving the rear clutch plate 106 disconnected. Under these conditions, therefore, the sun gear 101 rotates with the pump rotor 88, the ring gear 104 is held against rotation and the rear ring gear 99 is freed for rotation. Under these conditions, the speed ratio between the intermediate shaft and the propeller shaft will be approximately 9:5. For high gear, the rock shaft 114 is operated to disconnect the front clutch plate 103, connect the rear clutch plate, and move the control rod 149 to the left to disconnect both brakes. Under these conditions, the combination of gear carrier 105 and ring gear 99 is connected to rotate with the pump rotor 88, and the sun gear 98 is connected to rotate with the turbine rotor. This gives substantially direct drive.

The rock shaft 114 which controls the clutches and brakes may have a pin 150 on the rock arm 151 for engagement with the short rock arm 115 which controls the clutch shifting rings 116 and 117. The power mechanism for controlling this rock shaft comprises the rock arm 151 secured to the rock shaft 114 and two fluid actuators 152 for controlling this rock arm. Each fluid actuator 152 may comprise a casing 153 in which a flexible diaphragm 154 is mounted, one side of the diaphragm being subjected to atmospheric pressure and the other side being connectible with the manifold or the like. The diaphragms of the two actuators may be connected with a common operating rod 155 having a pair of operating pins 156 between which the actuating lever 151 for the rock shaft 114 extends.

A centralizing spring 157 may be provided for bringing the rock shaft 114 to neutral position when neither of the diaphragms 154 is subjected to the vacuum in the manifold. This centralizing spring may be of any usual or suitable construction, that shown comprising a coil torsion spring between the ends 158 of which the rock lever 151 is embraced, and a pair of stop pins 159 engageable by the spring arms to limit their movement but not engageable by the rock arm 151 in its movement. With this construction, it will be seen that when a vacuum is created in the right-hand actuator, the actuating rod will be moved to the right, assuming that the left-hand actuator is not subjected to vacuum and that if the left-hand actuator is subjected to vacuum and the right-hand actuator is not subjected to vacuum, the actuating rod will move to the left.

For vehicle propulsion, for example in tractors, the shaft 96 may be coupled to a low and reverse gear box, giving an overall range of six forward speeds and three reverse speeds.

Further modifications will be apparent to those skilled in the art and it is desired, therefore, that the invention be limited only by the scope of the appended claims.

Having thus described my invention, what I claim and desire to secure by Letters Patent is:

1. A hydro-planetary transmission comprising a drive shaft, a pump rotor driven therefrom, a turbine rotor driven from said pump rotor, a driven shaft, a first planetary gearing comprising a first gear carrier mounted on said driven shaft, a first planet gearing mounted on said gear carrier, a first sun gear and a first ring gear both meshing with said planet gearing, a shaft on which said sun gear and turbine rotor are mounted, a second planetary gearing comprising a second gear carrier secured to rotate with said first ring gear, a second planet gearing mounted on said second gear carrier, a second ring gear and a second sun gear both meshing with said second planet gearing, a first clutch means for placing said second sun gear into and out of positive driven relation with respect to said drive shaft, a second clutch means for placing the ring gear of said second planetary gearing into and out of positive driven relation with respect to said drive shaft, and means for holding said second ring gear against reverse rotation with respect to the rotation of said drive shaft.

2. A hydro-planetary transmission comprising a drive shaft, a pump rotor driven therefrom, a turbine rotor driven from said pump rotor, a driven shaft, a first planetary gearing comprising a first gear carrier mounted on said driven shaft, a first planet gearing mounted on said gear carrier, a first sun gear and a first ring gear both meshing with said planet gearing, a shaft on which said sun gear and turbine rotor are mounted, a second planetary gearing comprising a second gear carrier secured to rotate with said first ring gear, a second planet gearing mounted on said second gear carrier, a second ring gear and a second sun gear both meshing with said second planet gearing, a first clutch means for placing said second sun gear into and out of positive driven relation with respect to said drive shaft, a second clutch means for placing the ring gear of said second planetary gearing into and out of positive driven relation with respect to said drive shaft, means for holding said second ring gear against reverse rotation with respect to the rotation of said drive shaft, and common reciprocable means for actuating both said first clutch means and said second clutch means.

3. A hydro-planetary transmission comprising a drive shaft, a pump rotor driven therefrom, a turbine rotor driven from said pump rotor, a driven shaft, a first planetary gearing comprising a first gear carrier mounted on said driven shaft, a first planet gearing mounted on said gear carrier, a first sun gear and a first ring gear both meshing with said planet gearing, a shaft on which said sun gear and turbine rotor are mounted, a second planetary gearing comprising a second gear carrier secured to rotate with said first ring gear, a second planet gearing mounted on said second gear carrier, a second ring gear and a second sun gear both meshing with said second planet gearing, a first clutch means for placing said second sun gear into and out of positive driven relation with respect to said drive shaft, a second clutch means for placing the ring gear of said second planetary gearing into and out of positive driven relation with respect to said drive shaft, means for holding said second ring gear against reverse rotation with respect to the rotation of said drive shaft, and common reciprocable means for actuating both said first clutch means and said second clutch means, comprising means which, at one end of the reciprocable movement, connect the first clutch means and disconnect the second clutch means and which at the other end of the reciprocable movement, connect the second clutch means and disconnnect the first clutch means.

4. A hydro-planetary transmission comprising a drive shaft, a pump rotor driven therefrom, a turbine rotor driven from said pump rotor, a driven shaft, a first planetary gearing comprising a first gear carrier mounted on said driven shaft, a first planet gearing mounted on said gear carrier, a first sun gear and a first ring gear both meshing with said planet gearing, a shaft on which said sun gear and turbine rotor are mounted, a second planetary gearing comprising a second gear carrier secured to rotate with said first ring gear, a second planet gearing mounted on said second gear carrier, a second ring gear and a second sun gear both meshing with said second planet gearing, a first clutch means for placing said second sun gear into and out of positive driven relation with respect to said drive shaft, a second clutch means for placing the ring gear of said second planetary gearing into and out of positive driven relation with respect to said drive shaft, means for holding said second ring gear against reverse rotation with respect to the rotation of said drive shaft, and common reciprocable means for actuating both said first clutch means and said second clutch means, comprising means which, at one end of the reciprocable movement, connect the first clutch means and disconnect the second clutch means and which, at the other end of the reciprocable movement, connect the second clutch means and disconnect the first clutch means and, in an intermediate position, disconnect both clutch means from positive driven relation.

5. A hydro-planetary transmission comprising a drive shaft, a pump rotor driven therefrom, a turbine rotor driven from said pump rotor, a driven shaft, a first planetary gearing comprising a first gear carrier mounted on said driven shaft, a first planet gearing mounted on said gear carrier, a first sun gear and a first ring gear both meshing with said planet gearing, a shaft on which said sun gear and turbine rotor are mounted, a second planetary gearing comprising a second gear carrier secured to rotate with said first ring gear, a second planet gearing mounted on said second gear carrier, a second ring gear and a second sun gear both meshing with said second planet gearing, a first clutch means for placing said second sun gear into and out of positive driven relation with respect to said drive shaft, a second clutch means for placing said second ring gear into and out of driven relation with respect to said drive shaft, and means for holding said ring gear against reverse rotation with respect to the rotation of said drive shaft.

WILLARD L. POLLARD.